United States Patent

Hoblingre et al.

Patent Number: 5,306,032
Date of Patent: Apr. 26, 1994

[54] ADJUSTABLE STEERING COLUMN UNIT FOR AN AUTOMOBILE VEHICLE

[75] Inventors: André Hoblingre, Valentigney; Ghislain Passebeck, Audincourt, both of France

[73] Assignee: Ecia-Equipements et Composants pour l'Industrie Automobile, Audincourt, France

[21] Appl. No.: 27,322

[22] Filed: Mar. 3, 1993

[30] Foreign Application Priority Data

Mar. 4, 1992 [FR] France .................... 92 02594

[51] Int. Cl.$^5$ ............................. B62D 1/18
[52] U.S. Cl. ........................ 280/775; 74/493
[58] Field of Search .................. 280/775; 74/493

[56] References Cited

U.S. PATENT DOCUMENTS

| | | | |
|---|---|---|---|
| 4,753,121 | 6/1988 | Venable et al. | 74/493 |
| 4,788,880 | 12/1988 | Kester | 74/493 |
| 4,915,412 | 4/1990 | Yuzuriha et al. | 280/775 |
| 5,088,767 | 2/1992 | Hoblingre et al. | 280/775 |
| 5,148,717 | 9/1992 | Yamaguchi | 280/775 |

FOREIGN PATENT DOCUMENTS

| | | |
|---|---|---|
| 222628 | 5/1987 | European Pat. Off. |
| 427584 | 5/1991 | European Pat. Off. |
| 3920783 | 8/1990 | Fed. Rep. of Germany ...... 280/775 |
| 3924015 | 11/1990 | Fed. Rep. of Germany |
| 2061207 | 5/1981 | United Kingdom |
| 2245663 | 5/1990 | United Kingdom |

Primary Examiner—Margaret A. Focarin
Assistant Examiner—Christopher P. Ellis
Attorney, Agent, or Firm—Sughrue, Mion, Zinn, Macpeak & Seas

[57] ABSTRACT

An adjustable steering column unit includes a steering shaft having one end carrying a steering wheel and the opposite end connected to the rest of the steering mechanism, the shaft being movable in rotation in a column body (4), the body and/or the shaft being angularly and/or axially movable between two flanges of a fixing structure (5) for fixing the body to the remainder of the automobile vehicle, and the fixing structure comprising, at one end, locking means for locking the body in position and movable between locking and unlocking positions to permit the adjustment of the position of the steering wheel and, in proximity to the other end of the fixing structure, a guide bearing (7) for the body. The bearing (7) has a yoke portion, having a U-shaped section, of the fixing structure (5), in which is disposed a bushing (8) for mounting the body (4) without play. Opposed lateral walls of the bushing are connected to the flanges (7a,7b) of the yoke portion. The bushing includes an opening (8a) for receiving the body.

18 Claims, 2 Drawing Sheets

ADJUSTABLE STEERING COLUMN UNIT FOR AN AUTOMOBILE VEHICLE

BACKGROUND OF THE INVENTION

The present invention relates to a steering column unit which is adjustable in position for an automobile vehicle.

Some automobile vehicles have been provided for already several years with devices for adjusting the position of the steering wheel for the purpose of adapting the position of the latter to the morphology of the driver of the vehicle.

Thus the position of the steering wheel may be adjusted axially and/or angularly by the user.

Steering column units known in the art comprise a steering shaft one end of which carries a steering wheel while the other end is connected to the rest of the steering mechanism of the vehicle.

This steering shaft is mounted to be movable in rotation in a column body, for example by means of rotational guide means, and the body and/or the shaft are mounted to be angularly and/or axially movable between flanges of a structure for fixing the body to the rest of the automobile vehicle.

This fixing structure comprises at one of its ends means for locking in position the body and the shaft and therefore the steering wheel, the locking means being movable between a locking position and an unlocking position enabling the user to adjust the position of the steering wheel.

In the vicinity of the other end of the fixing structure, the latter includes a bearing for guiding the column body.

Different embodiments of these locking means have been proposed.

Thus, for example, the locking means may comprise a rod extending between the two flanges of the fixing structure, a first end of which rod bears against one of the flanges of the fixing structure while the second end is connected to locking elements whereby it is possible to move the flanges toward each other for locking the body, the shaft and the steering wheel in position.

Different embodiments of these locking elements have also been proposed.

Thus for example, these locking elements may be constituted by a screw and nut system, a toggle system, or a system employing an eccentric, connected to a shifting lever actuatable by the user.

Another embodiment of these locking elements is described in the document GB-A-2 113 164 in the name of the FORD MOTOR COMPANY LIMITED.

This document describes a column unit whose general arrangement is in the previously-described form and in which the locking elements comprise a stop member at the corresponding end of the rod, an intermediate bearing member in contact with the corresponding flange of a support structure and axially movable on the rod, and a shifting member disposed between the stop member and the intermediate bearing member, connected to a shifting lever and movable in rotation in a plane perpendicular to the rod between an active column-locking position and a withdrawn position for unlocking the column.

The confronting surfaces of the shifting member and the intermediate bearing member or the stop member, comprise, in respect of one, at least one projecting portion adapted to cooperate with a ramp of the other surface for the purpose of moving said two surfaces away from each other, and therefore the corresponding locking elements, so as to shift the flanges toward each other and lock the column in position upon the shifting of the actuating lever.

Various embodiments of the guide bearing for the column body in the fixing structure have also been developed.

However, these bearings generally comprise a bent portion of the structure extending in a plane roughly perpendicular to the flanges of the latter. This bent portion defines an opening in which the column body is engaged, a ring of an elastically yieldable material being interposed between the walls of said bent portion defining said opening and the column body, to enable the latter to move angularly and/or axially relative to the bent portion and therefore relative to the fixing structure.

It will be understood that this type of bearing has a number of drawbacks, in particular as to the maintenance of the column body in position without play in the fixing structure.

SUMMARY OF THE INVENTION

An object of the invention is therefore to overcome these problems by providing a guide bearing which is simple, reliable and enables the column body to be mounted without play in the fixing structure.

The invention therefore provides a steering column unit adjustable in position for an automobile vehicle, of the type comprising a steering shaft having one end which carries a steering wheel and an opposite end which is connected to the rest of the steering mechanism of the vehicle, said shaft being rotably mounted in a column body, the body and/or the shaft being mounted to be angularly and/or axially movable between two flanges of a fixing structure for fixing said body to the rest of the automobile vehicle, said fixing structure having at one of its ends locking means for locking in position the body and the shaft and therefore the steering wheel, said locking means being movable between a locking position and an unlocking position, to permit the adjustment of the position of the steering wheel by the user, and said fixing structure having in proximity to the other of its ends, a guide bearing for said body, characterized in that said guide bearing comprises a yoke portion having a generally U-shaped section of the fixing structure, in which is disposed a bushing for mounting the column body in the fixing structure without play, the opposite lateral walls of which are connected to the flanges of the yoke, the bushing comprising a cavity for receiving the column body.

Advantageously, the opposite lateral walls of the bushing include articulation means for articulating the bushing without play on the flanges of the yoke, permitting a pivoting of the bushing in the yoke about an axis which is roughly perpendicular to the axis of the column body.

In a particularly advantageous embodiment, means are also provided for putting the yoke-bushing-body unit under radial stress.

A better understanding of the invention will be had from the following description which is given solely by way of example with reference to the accompanying drawing in which:

DESCRIPTION OF A PREFERRED EMBODIMENT

Figure 1:
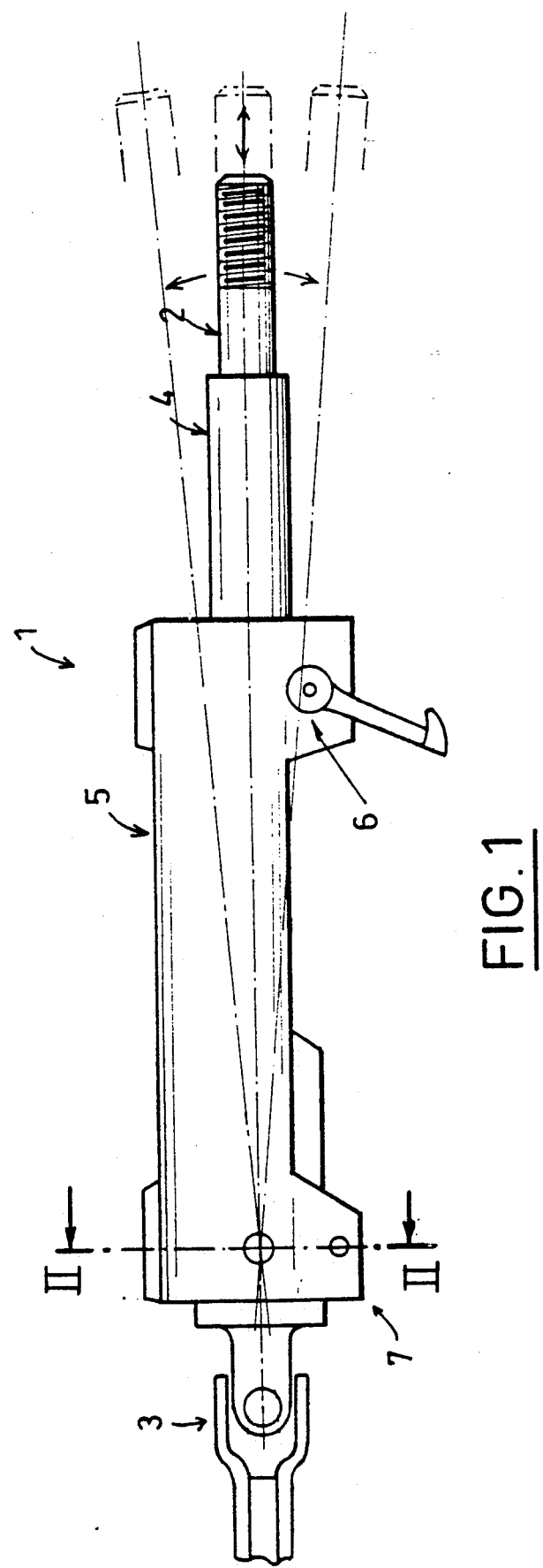
FIG. 1 is a diagrammatic view of an embodiment of a column unit according to the invention.

As can be seen in these Figures, and in particular in FIG. 1, a steering column unit for an automobile vehicle, generally designated by the reference character 1, comprises a steering shaft 2 one of the ends of which is adapted to carry a steering wheel while the other end is connected to the rest of the steering mechanism of the vehicle, generally designated by the reference character 3 in FIG. 1.

This steering shaft 2 is rotatably mounted in a column body 4 by conventional rotational guide means.

More particularly, the invention relates to steering column units adjustable in position and, in this case, the body 4 and/or the shaft 2 are mounted to be angularly and/or axially movable between two flanges of a fixing structure 5 fixing the body 4 to the rest of the automobile vehicle.

This fixing structure has conventionally a generally U-shaped section with two flanges between which the body 4 and the shaft 2 are disposed.

At one of its ends, this fixing structure comprises means for locking in position the body and the shaft and therefore the steering wheel.

These means are generally designated by the reference character 6 in FIG. 1 and are well known in the art, as mentioned before, so that they will not be described in more detail.

However, it will be observed that these means for locking in position comprise for example a rod which extends between the flanges of the fixing structure and has one end bearing against one of the flanges and the other end connected to means for locking in position the body and the shaft by shifting the flanges toward each other and clamping the column body therebetween.

These locking means are mounted to be movable between a locking position and an unlocking position whereby it is possible for the user to adjust the angular and axial position of the steering wheel.

In the embodiment shown in FIG. 1, said locking means are mounted to be movable between these two positions by an angular movement about the axis of the rod.

It will be understood that other embodiments of these locking means may be envisaged.

In proximity to the other end of the fixing structure the latter includes a guide bearing for the body generally designated by the reference character 7.

Figure 2:
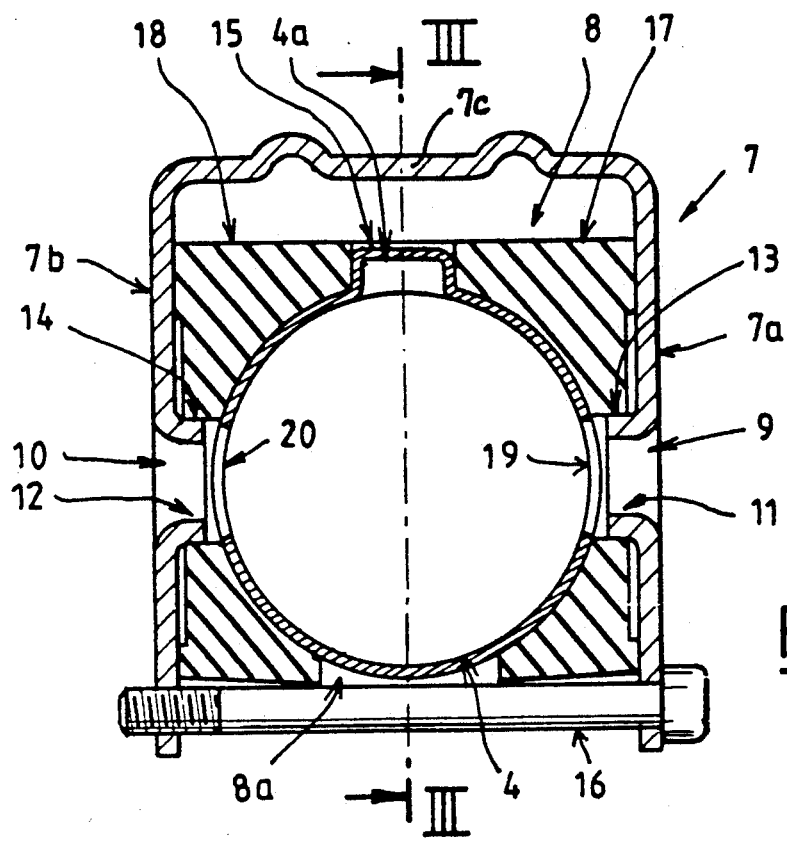
FIG. 2 is a sectional view taken on line II—II of FIG. 1.
Figure 3:
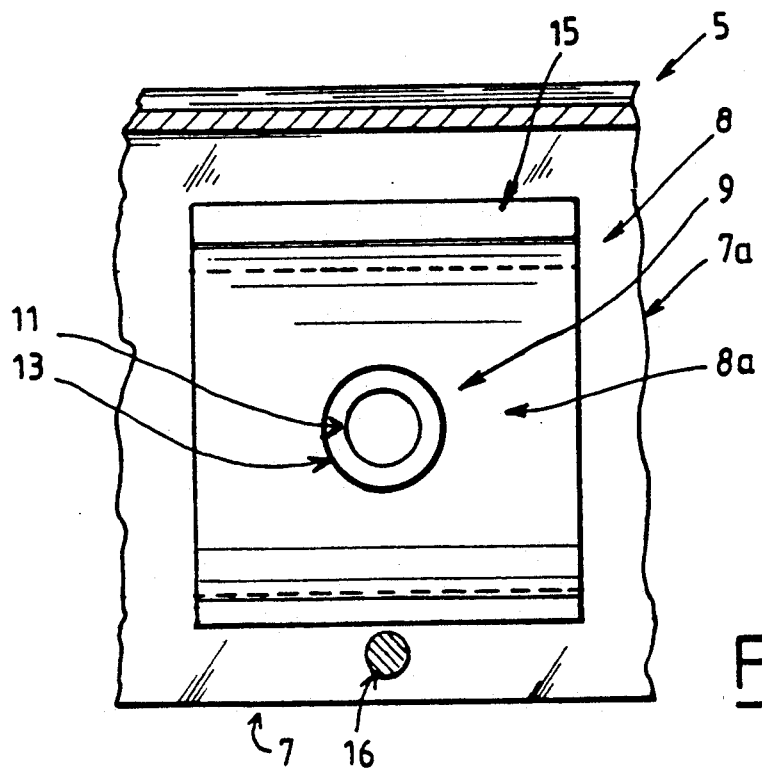
FIG. 3 is a sectional view taken on line III—III of FIG. 2.

As can be seen in FIGS. 2 and 3, this guide bearing 7 comprises in fact a yoke portion, having a generally U-shaped section, of the fixing structure 5 in which is disposed a bushing 8 for mounting without play the column body 4 in the fixing structure.

The body 4 has not been shown in FIG. 3 in order to render the drawing more clear.

The opposed lateral walls of the mounting bushing 8 are connected to the flanges 7a and 7b of the yoke portion 7c.

The bushing defines an opening for receiving the column body 4.

Advantageously, the opposed lateral walls of the bushing 8 include articulation means 9 and 10 for articulating the bushing 8 to the flanges 7a, 7b of the yoke portion 7c without play, whereby the bushing 8 is pivotable in the yoke portion 7c about an axis roughly perpendicular to the axis of the column body to permit the angular adjustment of the latter in the fixing structure.

These articulation means may be formed as shown in the Figures by trunnions generally designated by the reference characters 11 and 12 in one piece with the flanges 7a and 7b of the yoke and formed for example by a piercing and forming operation, these trunnions being engaged in corresponding openings 13 and 14 in the lateral walls of the bushing.

It will be understood that the opposite arrangement may also be envisaged, i.e. the lateral walls of the bushing 8 may have projecting portions engaged without play in pivot trunnions in one piece with the flanges of the yoke.

Note also that the steering column body is axially slidably mounted without play in the opening 8a of the bushing so that the user may adjust the axial position of the body and therefore the steering wheel.

The body and the bushing also include complementary abutment portions for preventing the body from rotating in the opening of the bushing.

In the embodiment shown in FIG. 2, the body 4 has a projecting portion 4a adapted to engage in an axial groove 15 in the bushing to permit an axial sliding of the body in the bushing but prevent any rotation of the latter.

This is for example required when the column body is associated with an anti-theft device comprising a bolt engaged in a slot in this body to prevent any rotation of the latter with respect to the fixing structure.

Further, means are also provided for putting the assembly comprising the yoke portion 7c, bushing 8 and column body 4 under radial stress.

In the illustrated embodiment, these stressing means comprise means for urging the flanges of the yoke portion toward each other, these means comprising for example a screw generally designated by the reference character 16 whose head bears against one of the flanges and whose free end cooperates with a tapped hole in the other flange so as to urge the flanges toward each other in a clamping action and put the aforementioned assembly under stress.

It will be understood that these stressing means and these means for urging the flanges toward each other may be arranged in different ways and may be constituted for example by elastically yieldable means, such as a spring extending between the two flanges or a combination of a screw and nut system and elastically yieldable means.

These stressing means provide a mounting without play of the column body in the bushing and of the bushing in the yoke portion of the fixing structure and afford an optimized guiding of the body and convenience in utilization of the steering wheel.

It will be understood that different embodiments of these stressing means may be envisaged.

Thus, for example, the bushing may also be formed at least in part by an elastically deformable material and this bushing would then be mounted pre-stressed between the flanges of the yoke portion and the column body.

Also in this case, means may be provided for maintaining the relative position of the flanges, as for example a system similar to the screw and nut system 16 shown in FIG. 2.

The bushing may also include elastically deformable lip portions bearing for example against the column body or against the flanges and enabling this assembly comprising the yoke portion, bushing and body to be put under stress.

Note also that, in the illustrated embodiment, the mounting bushing includes two portions constituting mounting jaws generally designated by the reference characters 17 and 18 in FIG. 2, these jaws extending between the column body and the flanges of the yoke portion on each side of the body to permit a mounting of the latter in the yoke portion without play.

Also note with respect to FIG. 2, that the body 4 may include openings 19 and 20 in alignment with the pivot trunnions of the flanges of the yoke portion which permit for example the insertion of a tool for locking the assembly in position when it is mounted on the vehicle.

Although in the embodiment shown in FIG. 1 the bearing is located at the end of the fixing structure the closest to the rest of the steering mechanism, it will be obvious that the positions of the locking means and this bearing may be reversed and it is then the locking means which are located at the end of the fixing structure the closest to the rest of the steering mechanism of the vehicle.

What is claimed is:

1. Steering column unit adjustable in position for an automobile vehicle, said unit comprising: a steering column body, a steering shaft rotatably mounted in said column body and having one end for carrying a steering wheel and an opposite end for connection to a steering mechanism of the vehicle, a fixing structure having two flanges for fixing said body to the automobile vehicle, at least one of said body and said shaft being mounted to be movable in at least one of an angular manner and an axial manner between said two flanges, locking means for locking in position said body and said shaft and therefore said steering wheel and carried by said fixing structure at a first end of said fixing structure and movable between a locking position and an unlocking position to permit the adjustment of the position of said steering shaft and therefore said steering wheel by the user, a guide bearing for guiding said body and carried by said fixing structure in proximity to a second end of said fixing structure opposed to said first end thereof, said guide bearing comprising a yoke portion having a generally U-shaped section, said flanges being part of said yoke portion, a bushing disposed in said yoke portion for mounting said column body in said fixing structure without play, opposite lateral walls of said bushing being connected to said flanges of said yoke portion, said bushing including an opening for receiving said column body and said opposite lateral walls of said bushing include means for articulating it without play to said bushing in said yoke about an axis substantially perpendicular to the axis of said column body.

2. Unit according to claim 1, wherein said articulation means comprise pivot trunnions in one piece with said flanges of said yoke portion, projecting portions on said lateral walls of said bushing being engaged without play in said trunnions.

3. Unit according to claim 1, wherein said articulation means comprise pivot trunnions in one piece with said flanges of said yoke portion, openings in said lateral walls of said bushing receiving said trunnions without play in the corresponding flanges of said yoke portion.

4. Unit according to claim 1, wherein said body is axially movably mounted in said opening of said bushing.

5. Unit according to claim 1, wherein said body and said bushing include complementary abutment portions for preventing said body to rotate in said opening of said bushing.

6. Unit according to claim 5, wherein said body has a projecting abutment portion engaged in an axial groove in said bushing.

7. Unit according to claim 1, comprising means for putting the assembly comprising said yoke, said bushing and said body under radial stress.

8. Unit according to claim 7, wherein said means for putting under stress comprise means for urging said flanges of said yoke toward each other.

9. Unit according to claim 7, wherein said bushing is formed at least in part by an elastically deformable material and is mounted in a pre-stressed state between said flanges of said yoke and said column body.

10. Unit according to claim 9, comprising means for maintaining the relative position of said flanges.

11. Unit according to claim 8, wherein said means for moving said flanges toward each other and maintaining the relative position of said flanges comprise a screw and nut system.

12. Unit according to claim 10, wherein said means for moving said flanges toward each other and maintaining the relative position of said flanges comprise a screw and nut system.

13. Unit according to claim 8, wherein said means for moving said flanges toward each other and maintaining the relative position of said flanges comprise elastically yieldable means.

14. Unit according to claim 10, wherein said means for moving said flanges toward each other and maintaining the relative position of said flanges comprise elastically yieldable means.

15. Unit according to claim 11, wherein said means for moving said flanges toward each other and maintaining the relative position of said flanges comprise elastically yieldable means.

16. Unit according to claim 1, wherein said bushing comprises two portions constituting jaws for mounting said body without play and extending on each side of said body.

17. The unit according to claim 1, wherein said locking means and said guide bearing are spaced apart along said steering shaft.

18. The unit according to claim 17, wherein said first end of said fixing structure faces said one end of said steering shaft, and said second end of said fixing structure faces said opposite end of said steering shaft.

* * * * *